(12) United States Patent
Chen

(10) Patent No.: US 9,717,954 B2
(45) Date of Patent: Aug. 1, 2017

(54) METHOD OF FORMING A CURED ELASTOMER AND ARTICLES OF THE CURED ELASTOMER

(71) Applicant: Feng Tay Enterprises Co., Ltd., Douliou, Yunlin County OT (TW)

(72) Inventor: John C. Chen, Hockessin, DE (US)

(73) Assignee: Feng Tay Enterprises Co., Ltd., Douliou, Yunlin County (TW)

( * ) Notice: Subject to any disclaimer, the term of this patent is extended or adjusted under 35 U.S.C. 154(b) by 408 days.

(21) Appl. No.: 14/029,122

(22) Filed: Sep. 17, 2013

(65) Prior Publication Data

US 2015/0011336 A1    Jan. 8, 2015

Related U.S. Application Data

(60) Provisional application No. 61/843,326, filed on Jul. 6, 2013.

(51) Int. Cl.
*A63B 37/00* (2006.01)
*C08F 136/06* (2006.01)
(Continued)

(52) U.S. Cl.
CPC ...... *A63B 37/0003* (2013.01); *A63B 37/0024* (2013.01); *A63B 37/0039* (2013.01);
(Continued)

(58) Field of Classification Search
CPC .................................................. A63B 37/0003
See application file for complete search history.

(56) References Cited

U.S. PATENT DOCUMENTS

| 4,546,980 A | 10/1985 | Gendreau et al. |
| 5,834,546 A | 11/1998 | Harris et al. |
| (Continued) | | |

FOREIGN PATENT DOCUMENTS

| CN | 1616529 A | 5/2005 |
| CN | 101087839 A | 12/2007 |
| (Continued) | | |

OTHER PUBLICATIONS

Office Action issued in Chinese patent application No. 201480038164.1, dated Dec. 27, 2016 (9 pages).
(Continued)

*Primary Examiner* — Larry Thrower
(74) *Attorney, Agent, or Firm* — Honigman Miller Schwartz and Cohn LLP

(57) ABSTRACT

A cured elastomer golf ball component is made by heating an elastomer compound containing an ethylenically unsaturated elastomer, an ethylenically unsaturated monomer, and first and second free radical initiators to a first crosslinking temperature $T_1$ in a compression mold and partially crosslinking the elastomer, then heating to a second crosslinking temperature $T_2$ and curing the elastomer component of the golf ball. Either: (i) the first initiator has a half-life of about 0.2-5 minutes at $T_1$, the second initiator has a half-life of about 0.2-5 minutes at $T_2$, and $T_2$ is higher $T_1$ by at least about 30° C.; or (ii) the second initiator's one-minute half-life temperature is at least about 30° C. higher than the first initiator's one-minute half-life temperature, $T_1$ is within about 20° C. of the first initiator's one-minute half-life temperature, and $T_2$ is within about 20° C. of the second initiator's one-minute half-life temperature.

13 Claims, 3 Drawing Sheets

(51) Int. Cl.

| | |
|---|---|
| *B29B 9/06* | (2006.01) |
| *B29C 45/72* | (2006.01) |
| *C08J 3/24* | (2006.01) |
| *B29C 43/02* | (2006.01) |
| *B29C 43/00* | (2006.01) |
| *B29C 43/18* | (2006.01) |
| *B29C 43/52* | (2006.01) |
| *B29D 99/00* | (2010.01) |
| *C08K 5/09* | (2006.01) |
| *C08K 5/14* | (2006.01) |
| *A63B 45/00* | (2006.01) |
| *B29C 45/14* | (2006.01) |
| *B29C 45/00* | (2006.01) |
| *B29K 9/00* | (2006.01) |
| *B29K 105/00* | (2006.01) |
| *B29L 31/54* | (2006.01) |
| *B29K 105/24* | (2006.01) |
| *C08F 136/04* | (2006.01) |
| *C08K 5/098* | (2006.01) |
| *B29L 9/00* | (2006.01) |

(52) U.S. Cl.
CPC ...... *A63B 37/0051* (2013.01); *A63B 37/0075* (2013.01); *A63B 37/0076* (2013.01); *A63B 37/0078* (2013.01); *A63B 37/0096* (2013.01); *A63B 45/00* (2013.01); *B29B 9/06* (2013.01); *B29C 43/003* (2013.01); *B29C 43/02* (2013.01); *B29C 43/027* (2013.01); *B29C 43/18* (2013.01); *B29C 43/52* (2013.01); *B29C 45/14819* (2013.01); *B29C 45/72* (2013.01); *B29D 99/0042* (2013.01); *C08F 136/06* (2013.01); *C08J 3/24* (2013.01); *C08J 3/243* (2013.01); *C08J 3/244* (2013.01); *C08J 3/247* (2013.01); *C08K 5/09* (2013.01); *C08K 5/14* (2013.01); *A63B 37/0018* (2013.01); *B29C 45/0001* (2013.01); *B29C 2043/182* (2013.01); *B29K 2009/00* (2013.01); *B29K 2105/0014* (2013.01); *B29K 2105/243* (2013.01); *B29K 2995/0046* (2013.01); *B29L 2009/00* (2013.01); *B29L 2031/546* (2013.01); *C08F 136/04* (2013.01); *C08J 2309/00* (2013.01); *C08J 2323/22* (2013.01); *C08K 5/098* (2013.01)

(56) References Cited

U.S. PATENT DOCUMENTS

| | | | |
|---|---|---|---|
| 6,180,040 B1 | 1/2001 | Ladd et al. | |
| 6,180,722 B1* | 1/2001 | Dalton | A63B 37/0003 473/373 |
| 7,595,016 B2 | 9/2009 | Hiraoka et al. | |
| 2001/0011045 A1 | 8/2001 | Takemura et al. | |
| 2002/0042311 A1* | 4/2002 | Watanabe | A63B 37/0003 473/371 |
| 2002/0162627 A1 | 11/2002 | Dunlap | |
| 2003/0038399 A1 | 2/2003 | Scolamiero | |
| 2003/0162931 A1 | 8/2003 | Bleys et al. | |
| 2004/0106475 A1 | 6/2004 | Sasaki et al. | |
| 2004/0242346 A1 | 12/2004 | Ohama | |
| 2005/0056964 A1 | 3/2005 | Hiraoka et al. | |
| 2005/0101753 A1 | 5/2005 | Schindler et al. | |
| 2006/0135287 A1 | 6/2006 | Kennedy, III et al. | |
| 2006/0166762 A1 | 7/2006 | Kim et al. | |
| 2008/0214739 A1 | 9/2008 | Voorheis | |
| 2009/0227395 A1 | 9/2009 | Sullivan et al. | |
| 2009/0283932 A1 | 11/2009 | Petrichko et al. | |
| 2009/0286625 A1 | 11/2009 | Petrichko et al. | |
| 2010/0076144 A1 | 3/2010 | Moore et al. | |
| 2011/0100628 A1 | 5/2011 | Scorsone et al. | |
| 2011/0224024 A1 | 9/2011 | Tutmark | |
| 2012/0080824 A1 | 4/2012 | Sullivan et al. | |
| 2012/0165475 A1 | 6/2012 | Ozawa et al. | |
| 2012/0165478 A1 | 6/2012 | Ozawa et al. | |
| 2012/0245271 A1 | 9/2012 | Pawlow et al. | |
| 2013/0131234 A1 | 5/2013 | Ozawa et al. | |
| 2013/0150183 A1 | 6/2013 | Takeichi et al. | |
| 2013/0241111 A1 | 9/2013 | Bender et al. | |
| 2013/0307182 A1 | 11/2013 | Okabe et al. | |
| 2013/0324312 A1 | 12/2013 | Okabe et al. | |
| 2014/0054819 A1 | 2/2014 | Lin | |
| 2014/0187348 A1 | 7/2014 | Kim et al. | |
| 2014/0357408 A1 | 12/2014 | Shindo et al. | |
| 2015/0011335 A1 | 1/2015 | Chen | |
| 2015/0258387 A1 | 9/2015 | Hwang et al. | |
| 2015/0258388 A1 | 9/2015 | Watanabe et al. | |

FOREIGN PATENT DOCUMENTS

| | | |
|---|---|---|
| CN | 101553287 A | 10/2009 |
| CN | 103130981 A | 6/2013 |
| EP | 0524841 A1 | 1/1993 |
| JP | S62122684 | 6/1987 |
| JP | S64-074241 A | 3/1989 |
| JP | H0654928 A | 3/1994 |
| JP | 2004024851 A | 1/2004 |
| JP | 2013244378 A | 12/2013 |
| WO | WO-9736724 A2 | 10/1997 |

OTHER PUBLICATIONS

N.N.: List of Organic Peroxides as Cross-Linking Agent, Feb. 1, 2010, pp. 1068-27; url:http://kr.ec21.com/co/c/chemex/upfile/24.pdf.

N.N.: Vanderbilt Varox Brochure—Peroxides for the Rubber and Plastics Industries, R.T. Vanderbilt Co., Inc., Jun. 21, 2010, pp. 1-5; url:http://www.camsi-x.com/web/Por_Mercado/VAROX_Perocides_Brochure.pdf.

Organic Peroxides: Crosslinking Elastomers and Thermoplastics, Mar. 23, 2010, pp. 1-15; url:http://www.neochemical.ru/file/brochure crosslinking peroxides.pdf.

Perbutyl P-N.N: List of Organic Peroxides as Curing Agent, Feb. 1, 2010, pp. 995-33; url:http://kr.ec21.com/co/c/chemex/upfile/25.pdf.

Written Opinion and International Search Report for PCT/US2014/045332 dated Sep. 30, 2014.

Written Opinion and International Search Report for PCT/US2014/045333 dated Sep. 10, 2014.

Written Opinion and International Search Report for PCT/US2014/045334 dated Sep. 10, 2014.

Written Opinion and International Search Report for PCT/US2014/045336 dated Sep. 10, 2014.

Written Opinion and International Search Report for PCT/US2014/045337 dated Sep. 16, 2014.

Office Action issued in Japanese patent application No. 2016-524361, dated Feb. 20, 2017 (7 pages).

* cited by examiner

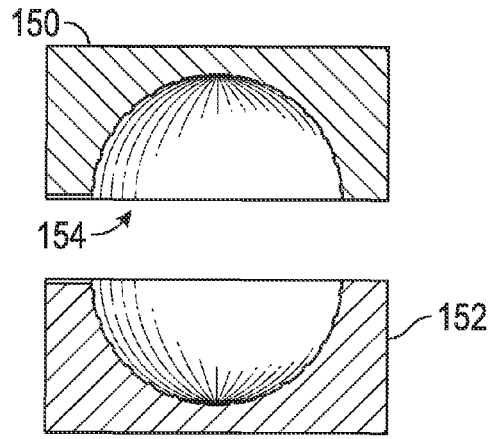
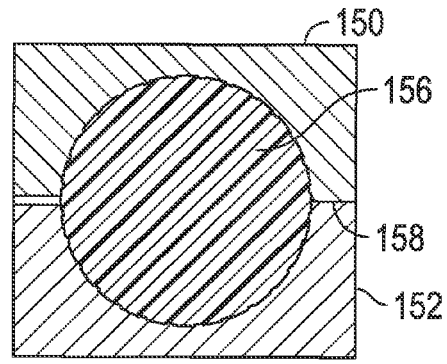
FIG. 5A  FIG. 5B
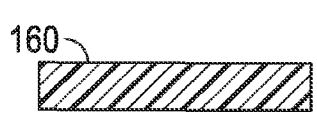
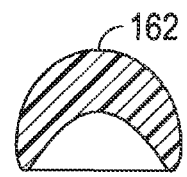
FIG. 6A  FIG. 6B
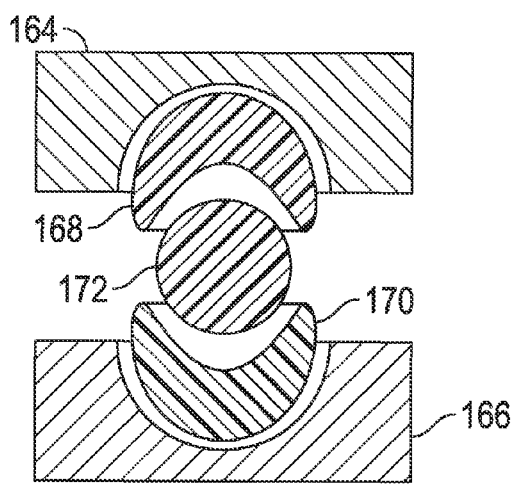
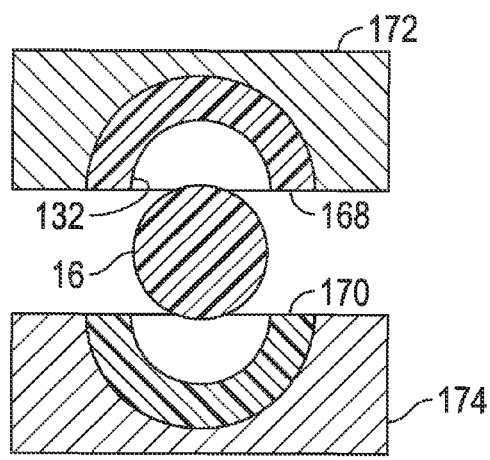
FIG. 6C  FIG. 6D

METHOD OF FORMING A CURED ELASTOMER AND ARTICLES OF THE CURED ELASTOMER

TECHNICAL FIELD

The present disclosure relates to methods of forming a cured elastomer and to articles formed from the cured elastomer.

BACKGROUND

This section provides information helpful in understanding the invention but that is not necessarily prior art.

Articles formed from cured elastomers may have excellent physical properties, such as stability, durability, flexibility, elasticity, and resilience. For example, a core of a golf ball may be formed from a cured elastomer and may be configured to provide the golf ball with specific characteristics, such as compression, spin, velocity, and resilience. As such, golf balls including cores formed from cured elastomers may be optimized for various playing abilities and conditions.

SUMMARY

This section provides a general summary of the disclosure and may not be comprehensive of its full scope or all of the disclosed features.

A method of forming a cured elastomer includes partially crosslinking an elastomer compound at a first crosslinking temperature to form a precursor compound. The elastomer compound comprises an elastomer, such as an ethylenically unsaturated elastomer or other thermoplastic elastomer; a first free radical initiator having a first half-life of from about 0.2 minutes to about 5 minutes at a first crosslinking temperature; and a second free radical initiator. The precursor compound is further crosslinked at a second crosslinking temperature that is higher than the first crosslinking temperature by at least about 30° C. to thereby form the cured elastomer. The second free radical initiator has a second half-life of from about 0.2 minutes to about 5 minutes at the second crosslinking temperature.

An article comprises a cured elastomer. The cured elastomer is formed from a precursor compound and has a final crosslinking density. The precursor compound is thermoplastic and is formed from an elastomer compound. The elastomer compound comprises an ethylenically unsaturated elastomer, a first free radical initiator, and a second free radical initiator. The first free radical initiator has a first half-life of from about 0.2 minutes to about 5 minutes at a first crosslinking temperature. The second free radical initiator has a second half-life of from about 0.2 minutes to about 5 minutes at a second crosslinking temperature that is higher than the first crosslinking temperature by at least about 30° C. The elastomer compound is partially crosslinked at the first crosslinking temperature to a first crosslinking density that is at most about 40% of the final crosslinking density. The precursor compound is further crosslinked at the second crosslinking temperature to form the cured elastomer.

A method of forming a golf ball includes partially crosslinking an elastomer compound at a first crosslinking temperature to form a precursor compound. The elastomer compound comprises an ethylenically unsaturated elastomer, a first free radical initiator having a first one-minute half-life temperature, and a second free radical initiator having a second one-minute half-life temperature that is higher than the first one-minute half-life temperature by at least about 30° C. The first crosslinking temperature is equal to from about 20° C. lower than the first one-minute half-life temperature to about 20° C. higher than the first one-minute half-life temperature. The method also includes forming a core by further crosslinking the precursor compound at a second crosslinking temperature to thereby form a cured elastomer. The second crosslinking temperature is higher than the first crosslinking temperature and is equal to from about 20° C. lower than the second one-minute half-life temperature to about 20° C. higher than the second one-minute half-life temperature. The method further includes disposing a cover on the core such that the cover surrounds the core to thereby form the golf ball.

A golf ball includes a core comprising a cured elastomer and a cover disposed on and surrounding the core. The cured elastomer is formed from an elastomer compound comprising an ethylenically unsaturated elastomer, a first free radical initiator having a first one-minute half-life temperature, and a second free radical initiator having a second one-minute half-life temperature that is higher than the first one-minute half-life temperature by at least about 30° C. The elastomer compound is partially crosslinked at a first crosslinking temperature to form a precursor compound. The first crosslinking temperature is equal to from about 20° C. lower than the first one-minute half-life temperature to about 20° C. higher than the first one-minute half-life temperature. The precursor compound is further crosslinked at a second crosslinking temperature to thereby form the cured elastomer. The second crosslinking temperature is higher than the first crosslinking temperature and is equal to from about 20° C. lower than the second one-minute half-life temperature to about 20° C. higher than the second one-minute half-life temperature.

An elastomer compound for forming a cured elastomer comprises an ethylenically unsaturated elastomer, a first free radical initiator having a first one-minute half-life temperature of at least about 120° C. and at most about 170° C., and a second free radical initiator having a second one-minute half-life temperature that is higher than the first one-minute half-life temperature by at least about 30° C. The first free radical initiator is present in the elastomer compound in an amount of at most about 40 parts by weight based on 100 parts by weight of a total amount of the first free radical initiator and the second free radical initiator.

The cured elastomer, and articles formed from the cured elastomer, may have excellent physical properties. For example, the cured elastomer and articles may have excellent resilience. In particular, partially crosslinking the elastomer compound at the first crosslinking temperature with the first free radical initiator and further crosslinking the precursor compound at the second crosslinking temperature with the second free radical initiator may provide the cured elastomer with excellent resilience and softness as compared to other cured elastomers which are not formed by the dual-stage cure and dual-cure temperature methods. For example, golf balls formed by the methods may have excellent coefficients of restitution and elasticity, and may exhibit excellent durability over an operating life and excellent spin during flight.

The above features and advantages and other features and advantages of the present disclosure are readily apparent from the following detailed description of the best modes for

BRIEF DESCRIPTION OF THE DRAWINGS

FIG. 5A is a schematic cross-sectional view of a pair of injection molding dies for forming a core of a golf ball.

FIG. 5B is a schematic cross-sectional view of a pair of injection molding dies having a thermoplastic core of a golf ball formed therein.

FIG. 6A is a schematic cross-sectional view of piece of rubber stock.

FIG. 6B is a schematic cross-sectional view of an intermediate layer cold-formed blank.

FIG. 6C is a schematic cross-sectional view of a pair of compression molding dies being used to form a pair of cold-formed blanks about a metallic spherical core.

FIG. 6D is a schematic cross-sectional view of a pair of compression molding dies being used to compression mold an intermediate layer of a golf ball about a polymeric core.

DETAILED DESCRIPTION

Figure 1:
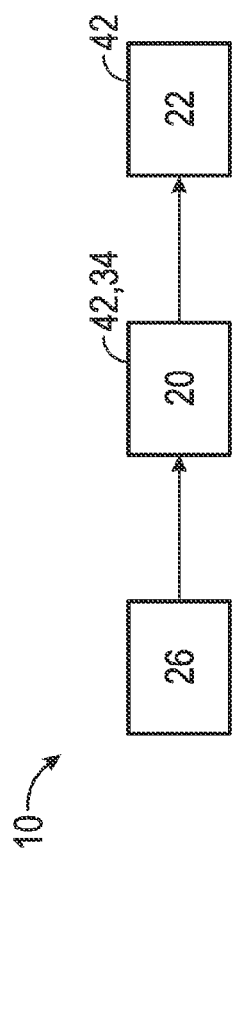
FIG. 1 is a flowchart of a method of forming a cured elastomer.
Figure 2:
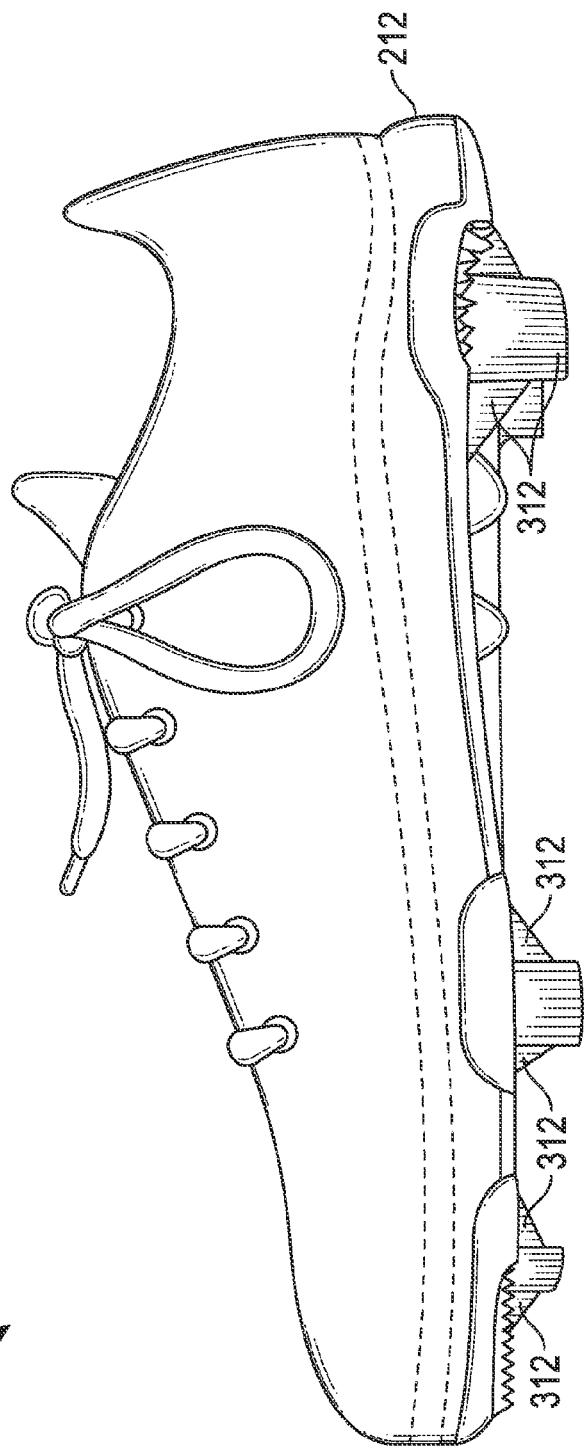
FIG. 2 is a schematic illustration of a side view of an article including the cured elastomer formed by the method of FIG. 1.

Referring to the Figures, wherein like reference numerals refer to like or identical elements, a method 10 of forming a cured elastomer is shown generally in FIG. 1. The method 10 and cured elastomer may be useful for forming any number of elastomer articles 12 (FIG. 2) or components of elastomer articles 12, such as, but not limited to, golf balls 112 (FIG. 4), sporting equipment, footwear components, e.g., outsoles 212 (FIG. 2) and traction elements 312 (FIG. 2) of outsoles 212, vehicle components, construction articles, sound-deadening articles, vibration-dampening articles, energy storage devices, resilient foams, furniture components, garden tools, conveyor belts, escalator belts and hand rails, and flooring. More specifically, the cured elastomer is a cured product, e.g., a thermoset, but is formed from a precursor compound that is a processable thermoplastic.

Figure 4:
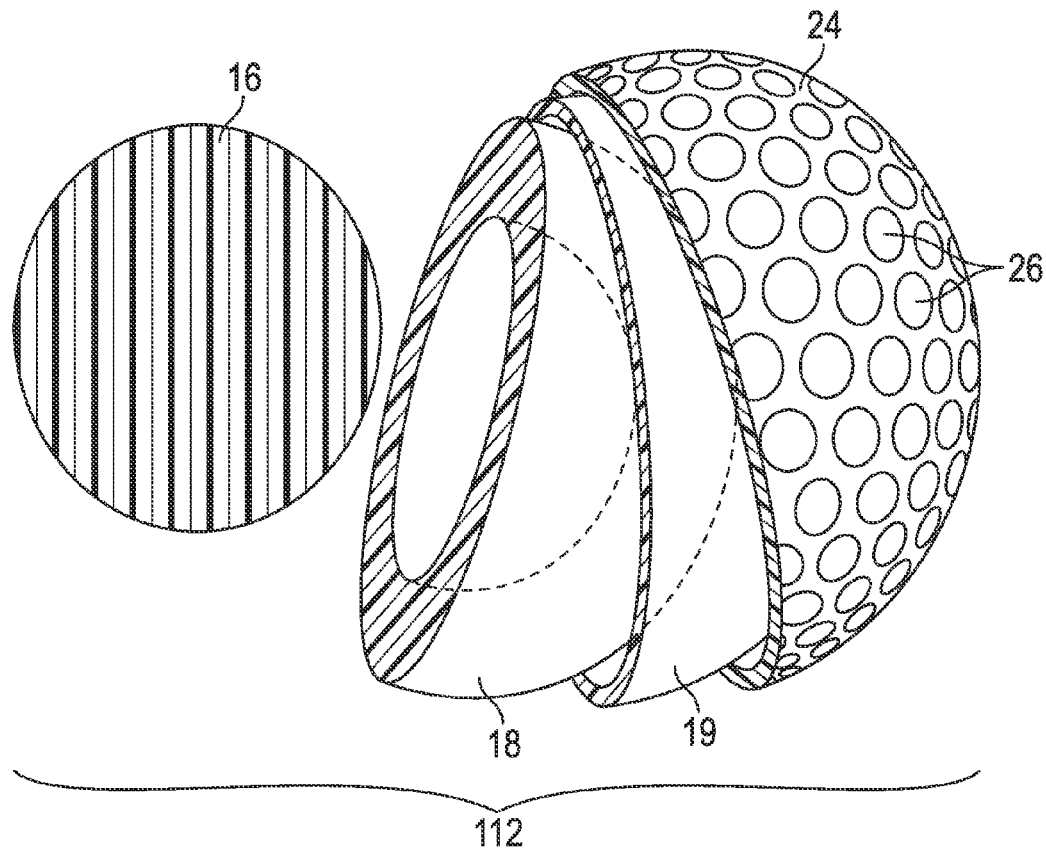
FIG. 4 is a schematic, enlarged, partial cross-sectional view of the golf ball formed by the method of FIG. 3.

In one non-limiting example, the method 10 may be useful for forming a core or a core component, e.g., a center 16 (FIG. 4) or one or more intermediate layers 18, 19 (FIG. 4), of a golf ball 112. FIG. 4 schematically illustrates an exploded, partial cross-sectional view of a golf ball 112. As shown, the golf ball 112 may have a multi-layer construction that includes a core with a center 12 surrounded by one or more intermediate layers 18, 19, and a cover 24 (i.e., where the cover 24 surrounds the core and forms an outermost layer of golf ball 112). While FIG. 4 generally illustrates a ball 112 with a four-piece construction, the presently described structure and techniques may be equally applicable to three-piece balls, as well as balls with five or more pieces. In general, the cover 24 may define an outermost layer of the ball 112 and may include any desired number of dimples 26, including, for example, between 280 and 432 total dimples, and in some examples, between 300 and 392 total dimples, and typically between 298 to 360 total dimples. As known in the art, the inclusion of dimples generally decreases the aerodynamic drag of the ball, which may provide for greater flight distances when the ball is properly struck.

In a completely assembled ball 112, each layer (including the center 16, cover 24, and one or more intermediate layers 18, 19) may be substantially concentric with every other layer such that every layer shares a common geometric center. Additionally, the mass distribution of each layer may be uniform such that the center of mass for each layer, and the ball as a whole, is coincident with the geometric center. In one non-limiting example, the method 10 may be useful for forming a core or a core component, e.g., a center 16 (FIG. 4) or one or more intermediate layers 18, 19 (FIG. 4), of a golf ball 112.

As used herein, the terms "a," "an," "the," "at least one," and "one or more" are interchangeable and indicate that at least one of an item is present. A plurality of such items may be present unless the context clearly indicates otherwise. All numerical values of parameters (e.g., of quantities or conditions) in this disclosure, including the appended claims, are to be understood as being modified in all instances by the term "about" whether or not "about" actually appears before the numerical value. "About" indicates that the stated numerical value allows some slight imprecision (e.g., with some approach to exactness in the value; approximately or reasonably close to the value; nearly). If the imprecision provided by "about" is not otherwise understood with this meaning, then "about" as used herein indicates at least variations that may arise from methods of measuring and using such parameters. In addition, disclosure of ranges includes disclosure of all values and further divided ranges within the entire range. Each value within a range and the endpoints of a range are all disclosed as separate embodiments. In this disclosure, for convenience, "polymer" and "resin" are used interchangeably to encompass resins, oligomers, and polymers. The terms "comprises," "comprising," "including," and "having" are inclusive and therefore specify the presence of stated items, but do not preclude the presence of other items. As used in this disclosure, the term "or" includes any and all combinations of one or more of the listed items. When the terms "first," "second," "third," etc. are used to differentiate various items from each other, these designations are merely for convenience and do not limit the items. Further, as used herein, the terminology "at least" is equivalent to "greater than or equal to," and the terminology "at most" is equivalent to "less than or equal to."

Referring again to FIG. 1, the method 10 includes partially crosslinking 20 an elastomer compound at a first crosslinking temperature to form the precursor compound, and further crosslinking 22 the precursor compound at a second crosslinking temperature that is higher than the first crosslinking temperature to thereby form the cured elastomer. That is, the method 10 includes first partially crosslinking 20 the elastomer compound in a first-stage curing operation before subsequently heating or curing the precursor compound at the higher, second crosslinking temperature in a second-stage curing operation.

Elastomer Compound

The method 10 (FIG. 1) may also include compounding or combining individual components to form the elastomer compound. For example, individual components may be mixed together in a continuous mixer or a batch mixer, e.g., an intermeshing rotor mixer, such as an Intermix mixer, a twin screw extruder, a tangential rotor mixer such as a Banbury mixer, or a two roll mill. The mixer may blend the components together via a single step or multiple steps, and may mix the components via dispersive mixing or distributive mixing to form the resulting elastomer compound.

A. Ethylenically Unsaturated Elastomer

More specifically, the elastomer compound includes an ethylenically unsaturated elastomer. The elastomer compound may also include more than one ethylenically unsaturated elastomer. The ethylenically unsaturated elastomer may be crosslinked to various degrees of crosslinking, e.g., to various crosslinking densities, at various stages of the method 10 (FIG. 1).

The ethylenically unsaturated elastomer may be, for example, an unsaturated rubber or a diene polymer or copolymer. Nonlimiting examples of suitable diene monomers that may be used in preparing such elastomers include 1,3-butadiene, isoprene, 1,3-pentadiene (piperylene), 2,3-dimethyl-1,3-butadiene, 1-phenyl-1,3-butadiene, 1,3-hexadiene, dicylopentadiene, thylidene norborene, and vinyl norborene. Nonlimiting examples of suitable co-monomers that may be used with these include ethylene, propylene, and aromatic vinyl compounds like styrene.

Nonlimitng examples of suitable unsaturated rubbers include natural rubbers (NR), synthetic rubbers, and mixtures of natural rubbers and synthetic rubbers such as balata, gutta-percha, acrylate-butadiene rubber (ABR), bromo-isobutylene-isoprene rubber (BIIR), butadiene rubber (BR), chloro-isoprene-isoprene rubber (CIIR), chloroprene rubber (CR), ethylene-propylene-diene rubber (EPDM), ethylene-propylene rubber (EPM), guayule rubber (GR), isobutylene-isoprene rubber (IIR), polyisobutylene rubber (IM), synthetic isoprene rubber (IR), acrylonitrile-butadiene rubber (NBR), acrylonitrile-chloroprene rubber (NCR), acrylonitrile-isoprene rubber (NIR), vinylpyridine-styrene-butadiene rubber (PSBR), styrene-butadiene rubber (SBR), styrene-chloroprene rubber (SCR), styrene-butadiene-styrene block copolymers (SBS), styrene-ethylene-butadiene-styrene block copolymers (SEBS), styrene-isoprene rubber (SIR), styrene-isoprene-styrene (SIS), vinylpyridine-butadiene rubber (VPBR), carboxylic-acrylonitrile-butadiene rubber (XNBR). These, as well as any other diene-containing elastomers, may be used in any combination.

In one non-limiting embodiment that is particularly suitable for forming the core 14 (FIG. 4) of the golf ball 112 (FIG. 4), the unsaturated rubber may be a high 1,4-cis-polybutadiene rubber having at least about 60%, preferably at least about 80%, more preferably at least about 90%, and most preferably at least about 95%, 1,4-cis content. In another non-limiting embodiment, the unsaturated rubber may be a low 1,4-cis -polybutadiene rubber having at most about 50% 1,4-cis content. In another non-limiting embodiment, the unsaturated rubber may be a high 1,4-trans-polybutadiene rubber having at least about 60%, preferably at least about 70%, such as 75% or 80%, more preferably at least about 90%, and most preferably at least about 95%, 1,4-trans content. In yet another non-limiting embodiment, the unsaturated rubber may be a low 1,4-trans-polybutadiene rubber having less than about 40% 1,4-trans content. Alternatively, the unsaturated rubber may be a high 1,2-vinyl polybutadiene rubber having at least about 40%, such as 50% or 60%, and preferably at least about 70%, 1,2-vinyl content. In another non-limiting embodiment, the unsaturated rubber may be a low 1,2-vinyl polybutadiene rubber having at most about 30%, preferably at most about 20%, and more preferably at most about 15%, such as about 10%, about 5%, or about 2%, 1,2-vinyl content.

In addition, the polybutadiene rubber may have any combination of 1,4-cis-, 1,4-trans-, and vinyl structures or content, such as having a 1,4-trans-content greater than a 1,4-cis-content or a 1,2-vinyl content; having a 1,4-cis-content greater than a 1,4-trans-content or a 1,2-vinyl content; or having a 1,2-vinyl content greater than a 1,4-cis-content or a 1,4-trans-content. Further, combinations of more than one of the aforementioned unsaturated rubbers may be selected to provide desirable physical, chemical, or performance characteristics of the article 12 (FIG. 2) formed from the elastomer compounds, such as the golf ball 112 (FIG. 4), including the core 14 (FIG. 4), the center 16 (FIG. 4), or one or more intermediate layers 18 (FIG. 4).

In various embodiments a preferred ethylenically unsaturated elastomer is high 1,4-cis-polybutadiene rubber.

B. Monomer

In some embodiments particularly useful for forming the core 14 (FIG. 4) of the golf ball 112 (FIG. 4), the elastomer compound may also include an ethylenically-unsaturated monomer. For example, the elastomer compound may further include an unsaturated carboxylic acid or a metal salt of the unsaturated carboxylic acid, which may effect crosslinking of components during partially crosslinking 20 (FIG. 1). The elastomer compound may also include more than one unsaturated carboxylic acid or metal salt of the unsaturated carboxylic acid.

The unsaturated carboxylic acid or the metal salt of the unsaturated carboxylic acid may have one or more ethylenic unsaturations. Suitable unsaturated carboxylic acids may include α,β-ethylenically unsaturated acids or internally unsaturated acids or anhydrides having 3 to 30 carbon atoms, such as acrylic acid, methacrylic acid, crotonic acid, maleic acid, fumaric acid, oleic acid, linoleic acid, erucic acid, maleic acid, and maleic anhydride.

Suitable metal salts of the unsaturated carboxylic acid may include Group I alkali metal salts, Group II alkaline earth metal salts, transition metal salts, or more specifically, magnesium salts, zinc salts, calcium salts, cobalt salts, iron salts, titanium salts, nickel salts, manganese salts, aluminum salts, sodium salts, and copper salts.

Specific examples of preferable unsaturated carboxylic acids or metal salts of the unsaturated carboxylic acids may include zinc diacrylate, magnesium diacrylate, calcium diacrylate, zinc dimethacrylate, magnesium dimethacrylate, calcium dimethacrylate, zinc dioleate, magnesium dioleate, calcium dioleate, zinc erucicate, magnesium erucicate, calcium erucicate, zinc maleate, magnesium maleate, calcium maleate, and combinations thereof.

Further, the unsaturated carboxylic acid or the metal salt of the unsaturated carboxylic acid may be present in the elastomer compound in an amount up to at most about 80 parts by weight based on 100 parts by weight of the ethylenically unsaturated elastomer. For example, the unsaturated carboxylic acid or the metal salt of the unsaturated carboxylic acid may preferably be present in the elastomer compound in an amount of from at least about 15 parts by weight to at most about 60 parts by weight based on 100 parts by weight of the ethylenically unsaturated elastomer. More preferably, the unsaturated carboxylic acid or the metal salt of the unsaturated carboxylic acid may be present in the elastomer compound in an amount of from at least about 15 parts by weight to at most 40 parts by weight based on 100 parts by weight of the ethylenically unsaturated elastomer.

In one non-limiting embodiment particularly suitable for the formation of golf ball cores 14 (FIG. 4), the unsaturated carboxylic acid or the metal salt of the unsaturated carboxylic acid may be zinc diacrylate or zinc dimethacrylate.

C. First Free Radical Initiator and Second Free Radical Initiator

Referring again to the method 10 (FIG. 1), the elastomer compound also includes a first free radical initiator and a second free radical initiator. The elastomer compound may also include more than one first free radical initiator or more than one second free radical initiator. The first free radical initiator initiates partial crosslinking of the elastomer compound, and the second free radical initiator initiates further crosslinking 22 (FIG. 1) of the precursor compound.

The first free radical initiator and the second free radical initiator may initiate crosslinking of the ethylenically unsaturated elastomer at different temperatures, i.e., at the first crosslinking temperature and at the second crosslinking temperature that is higher than the first crosslinking temperature, respectively. As such, the elastomer compound including the ethylenically unsaturated elastomer is partially crosslinked at about the first crosslinking temperature, i.e., a comparatively lower temperature, and is further crosslinked at about the second crosslinking temperature, i.e., a comparatively higher temperature. Therefore, the first free radical initiator may be characterized as a comparatively lower-temperature free radical initiator. In contrast, the second free radical initiator may be characterized as a comparatively higher-temperature free radical initiator. Further, the second free radical initiator may not initiate partial crosslinking of the elastomer compound in any significant extent during a first stage of the method 10 (FIG. 1), but may only initiate further crosslinking 22 (FIG. 1) of the precursor compound at a second stage of the method 10.

In a first relationship between the first and second free radical initiators, the first free radical initiator may have a half-life of from about 0.2 minutes to about 5 minutes at the first crosslinking temperature, and the second free radical initiator may have a half-life of from about 0.2 minutes to about 5 minutes at the second crosslinking temperature, with the second crosslinking temperature being higher than the first crosslinking temperature by at least about 30° C. In some non-limiting embodiments, the first free radical initiator may have a half-life at the first crosslinking temperature of from about 0.5 minutes to about 4 minutes or from about 1 minute to about 3 minutes. In these or other embodiments, the second free radical initiator may have a half-life at the second crosslinking temperature of from about 0.5 minutes to about 4 minutes or from about 1 minute to about 3 minutes. Further, the second crosslinking temperature may be higher than the first crosslinking temperature by at least about 35° C. or at least about 45° C. or at least about 50° C. or at least about 55° C. or at least about 60° C. or at least about 65° C. or at least about 70° C. In various embodiments, the second crosslinking temperature may be higher than the first crosslinking temperature by from about 30° C. or about 35° C. or about 40° C. to about 90° C. or to about 95° C. or to about 100° C., or preferably from about 40° C. to about 90° C. or from about 40° C. to about 85° C. or from about 45° C. to about 85° C. or from about 40° C. to about 80° C. or from about 45° C. to about 80° C. or from about 45° C. to about 75° C. or from about 50° C. to about 90° C. or from about 50° C. to about 85° C. or from about 50° C. to about 80° C. or from about 50° C. to about 75° C.

Instead of or in addition to the initiator half-lives at the respective crosslinking temperatures and the difference between the first and second crosslinking temperatures just described, there may be a second relationship between the first and second initiators such that the first free radical initiator has a one-minute half-life temperature that is at least about 30° C. lower than the second free radical initiator's one-minute half-life temperature, and in various embodiments the first free radical initiator's one-minute half-life temperature can be at least about 35° C. lower, or at least about 40° C. lower, or at least about 45° C. lower, or at least about 50° C. lower, or at least about 55° C. lower, or at least about 60° C. lower, or at least about 65° C. lower, or at least about 70° C. lower, or at least about 75° C. lower, or at least about 80° C. lower than the second free radical initiator's one-minute half-life temperature. In these embodiments, the first crosslinking temperature may be from about 20° C. lower to about 20° C. higher than the first one-minute half-life temperature and the second crosslinking temperature may be from about 20° C. lower to about 20° C. higher than the second one-minute half-life temperature. In example embodiments, the first crosslinking temperature may be from about 10° C. lower to about 10° C. higher than the first one-minute half-life temperature or from about 5° C. lower to about 5° C. higher than the first one-minute half-life temperature, and the second crosslinking temperature may independently be from about 10° C. lower to about 10° C. higher than the second one-minute half-life temperature or from about 5° C. lower to about 5° C. higher than the second one-minute half-life temperature. In particular embodiments of the second relationship between the first and second initiators, the first initiator's one-minute half-life temperature may be at least about 120° C. and at most about 170° C., preferably at least about 130° C. and at most about 155° C., or at least about 135° C. and at most about 150° C., or at most about 145° C., while, the second initiator's one-minute half-life temperature may be at least about 185° C. and at most about 260° C., preferably at least about 190° C. and at most about 250° C., or at least about 200° C. and at most about 250° C., or at least 210° C. and at most 250° C., or at most about 230° C.

The first and second initiators are preferably selected so that the first crosslinking temperature may be at least about 100° C. and at most about 190 C. For example, the first crosslinking temperature may be at least about 110° C. and at most about 190° C., or at least about 110° C. and at most about 180° C., or at least about 120° C. and at most about 180° C., or at least about 130° C. and at most about 180° C., or at least about 130° C. and at most about 170° C., or at least about 150° C. and at most about 170° C. It should be noted that the heat of the first crosslinking reaction may cause the temperature to rise from the nominal first crosslinking temperature to which the elastomer compound is heated. The temperature during the first crosslinking step may be allowed to increase, but should remain at least about 30° C. lower than the second crosslinking temperature. Similarly, the first and second initiators are preferably selected so that the second crosslinking temperature may be at least about 160° C. and at most about 280° C. For example, the second crosslinking temperature may be at least about 170° C. and at most about 270° C., or at least about 180° C. and at most about 260° C., or at least about 190° C. and at most about 250° C., or at least about 200° C. and at most about 240° C., or at least about 210° C. and at most about 240° C.

The first free radical initiator and the second free radical initiator may each be organic peroxides or azo compounds and, together with ionic crosslinkings effected by the optional unsaturated carboxylic acid or metal salt of the unsaturated carboxylic acid, may provide articles 12 (FIG. 2) formed from the elastomer compound with improved heat-resistance, flexibility, softness, resilience, and compression set.

Suitable organic peroxides may include, but are not limited to, dialkyl organic peroxides, diacyl organic peroxides, peroxyketal organic peroxides, peroxyester organic peroxides, peroxydicarbonates, and peroxymonocarbonates. More specifically, suitable organic peroxides include, but are not limited to, di-t-amyl peroxide; di-t-butyl peroxide; t-butyl cumyl peroxide; dicumyl peroxide; di(2-methyl-1-phenyl-2-propyl)peroxide; t-butyl-2-methyl-1-phenyl-2-propyl peroxide; di(t-butylperoxy)-diisopropylbenzene; benzoyl peroxide; 1,1-di(t-butoxy)-3,3,5-trimethyl cyclohexane; 3,3,5,7,7-pentamethyl-1,2,4-trioxepane; cumyl hydroperoxide; t-butyl hydroperoxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-iso-propylbenzene; n-butyl 4,4-bis(t-butyl-peroxy) valerate; t-butyl perbenzoate; benzoyl peroxide; n-butyl 4,4'-bis(butylperoxy)valerate; t-amyl perbenzoate; α,α-bis (t-butylperoxy)diisopropylbenzene; and combinations thereof that suit the parameters for the first and second free radical initiators in a particular embodiment.

In one non-limiting embodiment, the first free radical initiator may be a first organic peroxide or a first azo compound, and the second free radical initiator may be a second organic peroxide or a second azo compound that is different from the first organic peroxide or the first azo compound, respectively. The first free radical initiator and the second free radical initiator are different from one another. For example, the first free radical initiator may be dibenzoyl peroxide or 1,1-bis(t-butylperoxy)-3,3,5-trimethylcyclohexane, and the second free radical initiator may be di-t-butyl peroxide, cumyl hydroperoxide, t-butyl hydroperoxide, or 3,3,5,7,7-pentamethyl-1,2,4-trioxepane.

Suitable azo compounds may include, but are not limited to, azobisisobutyronitrile (AIBN); 1,1'-azobis(cyclohexanecarbonitrile) (ABCN); 2,2'-azodi(2-methylbutyronitrile) (AMBN); 2,2'-azobis[2-(2-imidazolin-2-yl)propane]dihydrochloride; 2,2'-azobis[2-(2-imidazolin-2-yl)propane]disulfate dehydrate; 2,2'-azobis(2-methylpropionamidine)dihydrochloride; 2,2'-azobis[N-(2-carboxyethyl)-2-methylpropionamidine]hydrate; 2,2'-azobis{2-[1-(2-hydroxyethyl)-2-imidazolin-2-yl]propane}dihydrochloride; 2,2'-azobis[2-(2-imidazolin-2-yl)propane]; 2,2'-azobis(1-imino-1-pyrrolidino-2-ethylpropane)dihydrochloride; 2,2'-azobis {2-methyl-N-[1,1-bis(hydroxymethyl)-2-hydroxyethyl]propionamide}; 2,2'-azobis[2-methyl-N-(2-hydroxyethyl)propionamide]; and combinations thereof.

The first free radical initiator and the second free radical initiator may be present in the elastomer compound in combination in an amount of at least about 0.1 part by weight and at most about 20 parts by weight based on 100 parts by weight of the ethylenically unsaturated elastomer. For example, the first free radical initiator and the second free radical initiator may preferably be present in combination in the elastomer compound in an amount of at least about 0.1 part by weight and at most about 15 parts by weight based on 100 parts by weight of the ethylenically unsaturated elastomer. At amounts less than about 0.1 part by weight or greater than about 10 parts by weight based on 100 parts by weight of the ethylenically unsaturated elastomer the ethylenically unsaturated elastomer may not be sufficiently crosslinked during partially crosslinking 20 (FIG. 1), over-crosslinked during further crosslinking 22 (FIG. 1), or the elastomer compound may be poorly formed.

The first free radical initiator may be present in the elastomer compound in an amount of at most about 40 parts by weight based on 100 parts by weight of a total amount of the first free radical initiator and the second free radical initiator in combination. For example, the first free radical initiator may be present in the elastomer compound in an amount of from at least about 2 parts by weight and at most about 40 parts by weight based on 100 parts by weight of the total amount of the first free radical initiator and the second free radical initiator. In various embodiments, the first free radical initiator may be present in the elastomer compound in an amount of from at least about 5 parts by weight to at most about 40 parts by weight, or from at least about 2 parts by weight to at most about 35 parts by weight, or from at least about 5 parts by weight to at most about 35 parts by weight, or from at least about 8 parts by weight to at most about 35 parts by weight, or from at least about 10 parts by weight to at most about 30 parts by weight, or from at least about 10 parts by weight to about 30 parts by weight, or from at least about 5 parts by weight to at most about 25 parts by weight, or from at least about 8 parts by weight to about 25 parts by weight, based on 100 parts by weight of the total amount of the first free radical initiator and the second free radical initiator. In another example, the first free radical initiator may be present in the elastomer compound in an amount of from at least about 5 parts by weight and at most about 20 parts by weight based on 100 parts by weight of the total amount of the first free radical initiator and the second free radical initiator.

D. Third Free Radical Initiator

The elastomer compound may optionally include a third free radical initiator. When included, the third free radical initiator may also initiate partial crosslinking of the elastomer compound, but may initiate partial crosslinking at a lower temperature than that of the first free radical initiator. That is, the first free radical initiator, the second free radical initiator, and the third free radical initiator may each initiate crosslinking of the elastomer compound at different temperatures, i.e., at the first crosslinking temperature, the second crosslinking temperature, and a third crosslinking temperature, respectively.

More specifically, the third free radical initiator initiates partial crosslinking of the elastomer compound at the third crosslinking temperature, then the resulting partially crosslinked elastomer compound is heated to the first crosslinking temperature at which further crosslinking initiated by the first initiator produces the precursor compound as already described. The third free radical initiator may be present in the elastomer compound to introduce partial crosslinking of the elastomer compound at a comparatively lower third crosslinking temperature than the first crosslinking temperature and, in combination with the first free radical initiator at the first crosslinking temperature, impart sufficient rigidity to the precursor compound so that the precursor compound may maintain a desired shape, such as, for example, a half shell (not shown) for the golf ball 112 (FIG. 4).

The third free radical initiator may have a half-life of from about 0.2 minutes to about 5 minutes at the third crosslinking temperature, or a half-life of from about 0.5 minutes to about 4 minutes or from about 1 minute to about 3 minutes at the third crosslinking temperature. Further, the third crosslinking temperature may be less than the first crosslinking temperature by at least about 20° C., or by at least about 25° C., or by at least about 30° C., or by at least about 35° C. Additionally or alternatively, the third free radical initiator may have a one-minute half-life temperature that is lower than the first initiator's one-minute half-life temperature, for example by at least about 20° C., or by at least about 25° C., or by at least about 30° C., or by at least about 35° C. In specific examples, the third initiator may have a one-minute half-life temperature of at least about 60° C. or at least about 65° C. or at least about 70° C. or at least about 75° C. and at most about 120° C. or at most about 110° C. or at most about 100° C. or at most about 90° C. For example, the third initiator may have a one-minute half-life temperature of from about 65° C. to about 90° C. or from about 70° C. to about 100° C.

In specific examples, depending on the third free radical initiator and first free radical initiator selected, the third crosslinking temperature may be from about 50° C., about 55° C., or about 60° C. to at most about 120° C., about 110° C., or about 100° C.

The third free radical initiator may also be selected to provide the elastomer compound with excellent heat stability, flexibility, resilience, and compression set. The third free radical initiator may also be selected from azo compounds or organic peroxides such as, but not limited to, dialkyl organic peroxides, diacyl organic peroxides, peroxyketal organic peroxides, peroxyester organic peroxides, peroxydicarbonates, and peroxymonocarbonates. Further, the third free radical initiator is different from the first free radical initiator and the second free radical initiator.

When included, the third free radical initiator may be present in the elastomer compound in an amount of at most about 25 parts by weight based on 100 parts by weight of a total amount of the first free radical initiator, the second free radical initiator, and the third free radical initiator in combination. For example, the third free radical initiator may be present in the elastomer compound in an amount of from at least about 1 part by weight or about 2 parts by weight and at most about 25 parts by weight or about 20 parts by weight based on 100 parts by weight of the total amount of the first free radical initiator, the second free radical initiator, and the third free radical initiator. More preferably, the third free radical initiator may be present in the elastomer compound in an amount of from at least about 2 parts by weight and at most about 20 parts by weight, from at least about 3 parts by weight and at most about 20 parts by weight, from at least about 2 parts by weight and at most about 15 parts by weight, from at least about 3 parts by weight and at most about 15 parts by weight, based on 100 parts by weight of the total amount of the first free radical initiator, the second free radical initiator, and the third free radical initiator.

E. Additives

The physical properties of the cured elastomer may also be modified by including one or more additives in the elastomer compound. That is, the elastomer compound may include one or more additives such as, but not limited to, processing agents, anti-oxidants, ultraviolet stabilizers, pigments, plasticizers, rheology modifiers (such as nano-particles having comparatively high aspect ratios, nano-clays, nano-carbon, graphite, nano-silica, and the like), and combinations thereof.

The physical properties of the golf ball 112 (FIG. 4) or the core 14 (FIG. 4) or other article made with the cured elastomer may also be modified by including a filler component in the elastomer compound. The elastomer compound may include a filler component such as, but not limited to, clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), particulate synthetic plastics (such as high molecular weight polyethylene, polypropylene, polystyrene, polyethylene ionomeric resins, polyamide, polyester, polyurethane, polyimide, and the like), particulate carbonaceous materials (such as carbon black and the like), as well as cotton flock, cellulose flock, cellulose pulp, leather fiber, and combinations of any of the above. Non-limiting examples of heavy-weight filler components that may be used to increase the specific gravity of the cured elastomer may include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations thereof. Non-limiting examples of light-weight filler components that may be used to decrease the specific gravity of the cured elastomer may include particulate plastics, hollow glass spheres, ceramics, and hollow spheres, regrinds, or foams thereof. Such fillers may be used, for example, in golf balls to affect the weight or moment of inertia of the golf ball. For example, with reference to FIG. 4, any of the center 16 or intermediate layers 18, 19 forming the core of golf ball 112 may be made from the present dynamically crosslinked thermoplastic materials in which the rubber domains include one or more fillers selected to provide a certain weight or weight distribution to the golf ball 112.

Typical levels of these and other fillers include from about 10 phr to 100 phr or higher (where "phr" indicates parts by weight based on 100 parts of the elastomer). In various embodiments, the compositions may contain 10-80, 30-70, 40-60, or 50-60 phr filler. In various embodiments, the elastomer compound comprises a silica filler. Typical levels of silica filler include from about 10 phr to 100 phr or higher. In various embodiments, the elastomer compound may contain 10-80, 30-70, 10-60, 40-60, 50-60, or 35-60 phr filler.

The elastomer compound may include any of a wide variety of black, white, or colored pigments.

Particularly in the case of a rubber elastomer, the elastomer may optionally be compounded with a process oil to facilitate both compounding and processing. Process oils may come from petroleum sources, i.e. oils derived from plant or animal sources. The petroleum process oils may be hydrotreated to remove at least a large portion of the aromatic compounds. Petroleum-based oils can be selected from the group consisting of paraffinic oils, naphthenic oils, and aromatic oils. The non-petroleum-based oils may contain a sufficient level and distribution of fatty acid side chains to partially incorporate into the rubber composition at low levels or to act as internal plasticizers at higher levels. The oils derived from plant or animal sources can be classified by their iodine number. Plant- and animal-derived oils may contain double bonds, and each double bond can react with one iodine molecule. The iodine number, defined as the number of grams of iodine taken up by 100 grams of oil, gives a rough measure of the number of double bonds in an oil. The oil may have an iodine number of greater than 50 and, preferably, greater than 60. During crosslinking the double bonds are available for reaction with the unsaturated elastomer molecules. In another aspect, these oils are triglycerides of one or more unsaturated fatty acids. Such a plant- or animal-derived oil is capable of effectively crosslinking an unsaturated elastomer during crosslinking if the oil molecule contains a double bond on two or more of the three fatty acid side chains in an oil molecule. Preferred oils may have at least 50% of the fatty acid side chains with one or more sites of unsaturation. In this way, the unsaturated oils can facilitate processing of the rubber during the compounding phase and can be incorporated into the rubber network during the curing phase to enhance the physical properties of the rubber composition and prevent blooming.

In some embodiments the elastomer compound contains less than 5 phr (parts by weight per hundred parts of elastomer) of the process oil, preferably less than or equal to 3 phr. The elastomer composition may contain from about 0.1 to about 5 phr of vegetable oil. In other embodiments, the elastomer compounds contain a maximum of 3 phr vegetable oil, or less than 3 phr. In other embodiments, the elastomer compounds may contain from 0.1 to 2 phr vegetable oil. Non-limiting examples of vegetable oils include peanut oil, sunflower oil, cottonseed oil, linseed oil, soybean oil, rapeseed oil, sesame oil, safflower oil, poppy seed oil, tung oil, wheat oil, olive oil, palm oil, coconut oil, corn oil, palm-kernel oil, castor oil, cocoa butter, cocoa oil, and mixtures thereof. Castor oil has unique chemistry in that it is the only source of an 18 carbon hydroxylated fatty acid with one double bond (12-hydroxyoleic acid or ricinoleic acid). This fatty acid consistently comprises about 90% of castor oil. The presence of hydroxyl groups provides this oil with advantages, especially in predominantly saturated rubbers such as butyl (IIR) and halogenated butyl rubbers (BIIR, CIIR). Castor oil can also be used in more polar rubber compounds such as halogenated rubbers. This is especially advantageous, since traditional petroleum oils have limited solubility in these types of rubbers.

The ethylenically unsaturated elastomer, first free radical initiator, second free radical initiator, optional third free radical initiator, optional unsaturated carboxylic acid or metal salt of the unsaturated carboxylic acid, and optional additives may be compounded together to form the elastomer compound. For example, the components may be mixed together in a continuous mixer or a batch mixer, e.g., an intermeshing rotor mixer, such as an Intermix mixer, an extruder (e.g., a twin screw extruder), a tangential rotor mixer such as a Banbury mixer, or a two roll mill. The mixer may blend the components together via a single step or multiple steps, and may mix the components via dispersive mixing or distributive mixing to form the resulting elastomer compound.

The resulting elastomer compound may be a blend of comparatively high molecular weight components and comparatively low molecular weight components, and may be a generally flowable compound having a viscosity suitable for handling and further processing. Comparatively higher molecular weight components may increase the solidity of the elastomer compound, and comparatively lower molecular weight components may enhance the fluidity of the elastomer compound.

Partially Crosslinking at the First Crosslinking Temperature

Referring again to FIG. 1, the method 10 of forming the cured elastomer includes partially crosslinking 20 the elastomer compound at the first crosslinking temperature to form the precursor compound. The method 10 also includes further crosslinking 22 the precursor compound at the second crosslinking temperature.

For the method 10 (FIG. 1), partially crosslinking 20 (FIG. 1) may include heating 30 (FIG. 3) the elastomer compound to about the first crosslinking temperature for from about 0.5 minute to about 15 minutes. For example, partially crosslinking 20 may include curing the elastomer compound at the first crosslinking temperature for from about 0.5 minute or from at least about 1 minute or from at least about 2 minutes or from at least about 3 minutes or at least about 4 minutes or at least about 5 minutes to at most about 15 minutes or at most about 13 minutes or at most about 10 minutes, or at most about 7 minutes, or at most about 6 minutes. In other examples, partially crosslinking 20 may include curing the elastomer compound at the first crosslinking temperature for from about 0.5 minute or for at least about 1 minute or at least about 2 minutes to at most about 3 minutes.

In one example, partially crosslinking 20 (FIG. 1) may include curing the elastomer compound at the first crosslinking temperature for from about 0.5 to about 5 minutes or from about 0.5 to about 3 minutes.

After partially crosslinking 20 (FIG. 1), the resulting precursor compound is thermoplastic, and is further crosslinkable. That is, the precursor compound remains moldable. Further, the precursor compound may have a first crosslinking density. As used herein, "crosslinking density" refers to an average number of chain segments between crosslinks per unit volume of the precursor compound or cured elastomer. That is, crosslinking density refers to a concentration of crosslinks within the precursor compound or cured elastomer. In contrast, after further crosslinking 22 (FIG. 1), the cured elastomer may be fully cured, and may have a final crosslinking density. In particular, partially crosslinking 20 may include curing the elastomer compound so that the first crosslinking density is at most about 40% of the final crosslinking density. For example, the first crosslinking density of the precursor compound after partially crosslinking 20 may be from about 1% to about 40%, or from about 2% to about 40%, or from about 2% to about 30%, or from about 5% to about 30%, or from about 5% to about 20%, or from about 10% to about 30%, or from about 20% to about 30% of the final crosslinking density. That is, the elastomer compound is partially crosslinked at the first crosslinking temperature to a first crosslinking density that is at most about 40% of the first crosslinking density. In other examples, the first crosslinking density of the precursor compound after partially crosslinking 20 may be from about 1% to about 20%, or from about 2% to about 20%, or from about 2% to about 10%, or from about 5% to about 20%, or from about 5% to about 10% of the final crosslinking density.

The resulting precursor compound may have a non-fluid physical form, and may have sufficient mechanical integrity to maintain a desired shape, even though the precursor compound is thermoplastic. That is, the precursor compound may have a physical form that is suitable for handling and further processing, including sufficient crosslinking so as to hold a desired shape. The precursor compound has a relatively lower degree of crosslinking compared to the final completely cured elastomer compound.

A. Molding the Elastomer Compound

With continued reference to FIG. 1, the method 10 may further include, concurrent to partially crosslinking 20, molding 42 the elastomer compound in a cavity defined by a mold to form the precursor compound. That is, the elastomer compound may be partially crosslinked within the cavity of the mold. For example, the elastomer compound may be fed to an injection molding device (not shown), and advanced through the injection molding device by one or more screws (not shown) towards the cavity of the mold. As the one or more screws advance the elastomer compound through the injection molding device, the elastomer compound may be heated to the about the first crosslinking temperature and injected into the cavity of the mold. As such, the elastomer compound may be partially crosslinked within the cavity of the mold to thereby form the precursor compound. For this embodiment, the precursor compound may be formed into a desired shape, such as a preform.

In another embodiment, molding 42 may include compression molding 32 (FIG. 3) the elastomer compound within the cavity defined by the mold. For example, the mold may include a first portion and a second portion matable with the first portion to define the cavity between them. The elastomer compound may be heated to about the first crosslinking temperature and disposed within the first portion of the open, heated cavity of the mold, and the second portion may mate with the first portion to seal off the cavity. The elastomer compound may be partially crosslinked within the cavity of the mold to thereby form the precursor compound.

B. Extruding the Elastomer Compound

Alternatively, in another embodiment described with continued reference to FIG. 1, the method 10 may further include, partially crosslinking 20 the elastomer compound 20 in an extruder and then extruding 34 the partially-crosslinked elastomer compound as strands through a plurality of openings defined by a die and cut to form the plurality of pellets. The elastomer, initiators, and other components may be fed into the extruder, for example by a hopper or other port or ports and advanced through the extruder by one or more screws with mixing and kneading of the components by the screws, then extruded through an opening or openings in a die at the downstream end of the extruder. As the one or more screws advance the mixed elastomer compound through the extruder, the elastomer compound may be heated to the first crosslinking temperature to partially crosslink the elastomer within the extruder to form a precursor compound that is extruded through a die at the end of the extruder. The elastomer compound may also be made in other equipment, then introduced into the extruder for partial crosslinked at the first crosslinking temperature. The die may, for example, have a plurality of openings and the extrudate may be extruded as filaments that are cooled to solidify the precursor compound (e.g., in a water bath) and pelletized by cutting, e.g., with a rotary cutter, into pellets for subsequent molding at the second crosslinking temperature to form the cured elastomer article. For example, the precursor compound pellets may be subsequently fed to an injection molding device or molded in a compression molding device. Alternatively, the pellets could also be formed by an underwater die face pelletizer.

Advantageously, the resulting plurality of pellets formed from the precursor compound may have sufficient mechanical integrity such that the plurality of pellets may not fuse together, but may instead remain separated as individual pellets. As such, the plurality of pellets may be optionally mixed with other feedstock or subsequently processed, e.g., molded by injection or compression, into a desired shape.

In an alternative embodiment, the elastomer, initiators, and other components may be compounded before being introduced into the extruder. For example, the compounding may take place in a different extruder, a two-roll mill, or other equipment useful for mixing such materials.

In an alternative embodiment, the partially-crosslinked elastomer compound may be extruded in a different shape, for example a sheet or tube or may be extruded into an injection mold where it is further crosslinked at a second crosslinking temperature.

Further Crosslinking at the Second Crosslinking Temperature

Referring again to the method 10 (FIG. 1), the method 10 also includes further crosslinking 22 (FIG. 1) the precursor compound at the second crosslinking temperature that is higher than the first crosslinking temperature or related to the one-minute half-life temperature of the second initiator as earlier described to thereby form the cured elastomer. Further crosslinking 22 (FIG. 1) in general adds to a total number of crosslinks or covalent bonds of the elastomer, further curing the precursor compound to thereby form the cured elastomer article. That is, further crosslinking 22 builds upon the partial crosslinking previously effected at the first crosslinking temperature. The precursor compound product of the first crosslinking temperature, subject to the further crosslinking 22, transitions to the cured elastomer at the second crosslinking temperature.

Further crosslinking 22 (FIG. 1) includes heating 30 (FIG. 3) the precursor compound to the second crosslinking temperature for a period of time, such as from about 1 minute to about 30 minutes. For example, further crosslinking 22 may include curing the precursor compound at the second crosslinking temperature for from about 1 to about 30 minutes, or from about 3 to about 30 minutes, or from at least about 3 minutes to about 25 minutes, or from at least about 3 minutes to about 20 minutes, or from about 5 to about 30 minutes, or from at least about 5 minutes to about 25 minutes, or from at least about 5 minutes to about 20 minutes, or from about 7 to about 30 minutes, or from at least about 7 minutes to about 25 minutes, or from at least about 7 minutes to about 20 minutes, or from about 10 to about 30 minutes, or from at least about 10 minutes to about 25 minutes, or from at least about 10 minutes to about 20 minutes.

After further crosslinking 22 (FIG. 1), the resulting cured elastomer is a thermoset, which may not be further crosslinkable. That is, the cured elastomer may have the final crosslinking density. Therefore, the method 10 (FIG. 1) may be a dual-free radical initiator, dual-stage, dual-cure temperature process, and the cured elastomer may have any desired shape. That is, the cured elastomer may be substantially fully crosslinked or cured and may exhibit an as-molded shape or final form, or may be cut, ground, or shaved to a final shape or form.

Molding the Precursor Compound

With continued reference to FIG. 1, the method 10 may further include, concurrent to further crosslinking 22, molding 42 the precursor compound in the cavity defined by the mold. For example, for embodiments in which the precursor compound is formed within the injection molding device when the elastomer compound reaches about the first crosslinking temperature, the precursor compound may continue to advance through a second portion of the injection molding device (not shown) towards the cavity of the mold. The precursor compound may be injected into the cavity and molded within the cavity to form the cured elastomer.

In another example, the precursor compound may be compression molded. For example, the precursor compound may be heated to about the second crosslinking temperature and disposed within the first portion of the open, heated cavity of the mold, and the second portion may mate with the first portion to seal off the cavity. As such, the precursor compound may be further crosslinked within the cavity of the mold to thereby form the cured elastomer.

Alternatively, referring again to FIG. 1, the resulting plurality of pellets formed from the precursor compound during extrusion may then be subsequently processed to form the cured elastomer. For example, further crosslinking 22 may include molding 42 the plurality of pellets within the cavity defined by the mold. In one embodiment, the precursor compound in pelletized form may be further crosslinked via an injection molding device (not shown). For example, the precursor compound may advance through the injection molding device by one or more screws towards the cavity of the mold. As the one or more screws advances the precursor compound through the injection molding device, the precursor compound may be injected into the cavity of the mold and heated to about the second crosslinking temperature. As such, the precursor compound may be further crosslinked within the cavity of the mold to thereby form the cured elastomer.

Alternatively, as shown in FIG. 1, the resulting plurality of pellets formed during extruding 34 may then be subsequently compression molded to form the cured elastomer. For example, further crosslinking 22 may include compression molding 32 the plurality of pellets within the cavity defined by the mold and heating 30 (FIG. 3) the precursor compound to about the second crosslinking temperature. That is, the precursor compound may be further crosslinked by compression molding 32 (FIG. 3) the precursor compound in pelletized form within the cavity of the mold. For example, the precursor compound may be heated to about the second crosslinking temperature and disposed within the first portion of the open, heated cavity of the mold, and the second portion may mate with the first portion to seal off the cavity. As such, the precursor compound may be further crosslinked within the cavity of the mold to thereby form the cured elastomer.

Compounding the Third Free Radical Initiator

For embodiments in which the elastomer compound includes the optional third free radical initiator, the method 10 (FIG. 1) may further include, before partially crosslinking 20 (FIG. 1), compounding 26 (FIG. 1) the first free radical initiator, the second free radical initiator, the elastomer (which may be an ethylenically unsaturated elastomer), and the third free radical initiator to thereby form the elastomer compound. Likewise, for embodiments in which the elastomer compound includes the unsaturated monomer (e.g., unsaturated carboxylic acid or the metal salt of the unsaturated carboxylic acid), the method 10 may further include, before partially crosslinking 20, compounding 26 the first free radical initiator, the second free radical initiator, the optional third free radical initiator, the ethylenically unsaturated elastomer, and the unsaturated carboxylic acid or the metal salt of the unsaturated carboxylic acid to thereby form the elastomer compound. For example, the components may be mixed together in a continuous mixer or a batch mixer, e.g., an intermeshing rotor mixer, such as an Intermix mixer, a tangential rotor mixer such as a Banbury mixer, or a two roll mill. The mixer may blend the components together via a single step or multiple steps, and may mix the components via dispersive mixing or distributive mixing to form the resulting elastomer compound.

For these embodiments including the third free radical initiator, partially crosslinking 20 (FIG. 1) may include first curing the elastomer compound at the third crosslinking temperature. Therefore, for embodiments including the third free radical initiator, partially crosslinking 20 (FIG. 1) may include curing the elastomer compound at the third crosslinking temperature for at most about 15 minutes. For example, partially crosslinking 20 may include curing the elastomer compound at the third crosslinking temperature for at least about 0.5 minute or about 1 minute, or about 2 minutes, or about 3 minutes, or about 4 minutes, or about 5 minutes and up to about 15 minutes, or up to about 12 minutes, or up to about 10 minutes, or up to about 8 minutes. In other examples, partially crosslinking 20 may include curing the elastomer compound at the third crosslinking temperature for at least about 0.5 minute, or about 1 minute, or about 2 minutes up to about 6 minutes, or up to about 5 minutes, or up to about 4 minutes.

The third crosslinking density may be from about 1% to about 50% of the of the first crosslinking density. For example, the third crosslinking density may be from about 1% to about 40%, or from about 2% to about 40%, or from about 2% to about 30%, or from about 5% to about 30%, or from about 5% to about 20%, or from about 10% to about 30%, or from about 20% to about 30% of the first crosslinking density. In other examples, the first crosslinking density of the precursor compound after partially crosslinking 20 may be from about 1% to about 20%, or from about 2% to about 20%, or from about 2% to about 10%, or from about 5% to about 20%, or from about 5% to about 10% of the first crosslinking density.

For embodiments including the third free radical initiator, partially crosslinking 20 may also be a dual-free radical initiator process, i.e., the third free radical initiator and the first free radical initiator; a dual-stage process, i.e., partially crosslinking 20 at the third crosslinking temperature and partially crosslinking 20 at the first crosslinking temperature; and a dual-cure temperature process, i.e., the third crosslinking temperature and the first crosslinking temperature.

Molding

Figure 3:
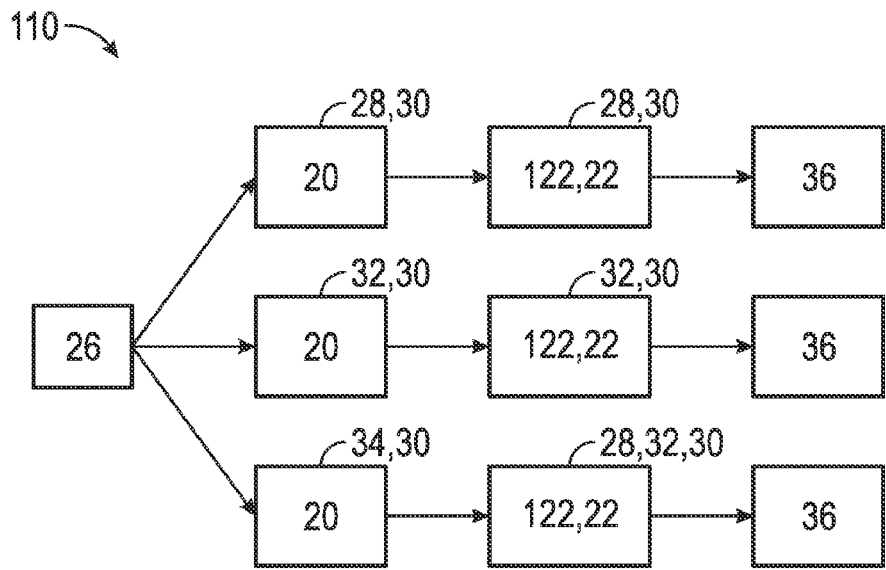
FIG. 3 is a flowchart of a method of forming a golf ball.

Referring now to FIG. 3, a method 110 of forming the golf ball 112 (FIG. 4) includes partially crosslinking 20 the elastomer compound at the first crosslinking temperature to form the precursor compound. The elastomer compound comprises the first free radical initiator, the second free radical initiator, and the ethylenically unsaturated elastomer. The elastomer compound may also optionally include the unsaturated carboxylic acid or the metal salt of the unsaturated carboxylic acid. In addition, the elastomer compound may also optionally include the third free radical initiator. The method 110 (FIG. 3) also includes forming 122 (FIG. 3) a golf ball core or core component by further crosslinking 22 the precursor compound at the second crosslinking temperature to thereby form the cured elastomer.

A. Injection Molding

With continued reference to FIG. 3, the method 110 may further include, concurrent to partially crosslinking 20, injecting 28 the elastomer compound into a cavity defined by a mold. That is, the elastomer compound may be partially crosslinked within the cavity of the mold. For example, the elastomer compound may be fed to an injection molding device (not shown), and advanced through the injection molding device by one or more screws (not shown) towards the cavity of the mold. As the one or more screws advance the elastomer compound through the injection molding device, the elastomer compound may be heated to the about the first crosslinking temperature and injected into the cavity of the mold. As such, the elastomer compound may be partially crosslinked within the cavity of the mold to thereby form the precursor compound. For this embodiment, the precursor compound may be formed into a desired shape, such as a preform or one or more half shells that may subsequently mate to form the core center 16 or an intermediate layer 18, 19 of the golf ball 112 (FIG. 4). For example, two half shells formed from the precursor compound may be subsequently fused, for example, by compression, into one or more intermediate layers 18, 19 (FIG. 4) of the golf ball 112.

For the method 110 (FIG. 3), the precursor compound is subsequently processed to form the cured elastomer. By way of non-limiting examples, the method 110 may include processing the precursor compound via thermoforming, vacuum forming, injection molding, compression molding, cutting, stamping, grinding, and other forming processes.

For example, for embodiments in which the elastomer compound is partially crosslinked within the injection molding device (not shown), further crosslinking 22 (FIG. 3) may include continuing to process the precursor compound within the injection molding device. For example, further crosslinking 22 may include injecting 28 (FIG. 3) the precursor compound into the cavity defined by the mold and heating 30 (FIG. 3) the precursor compound to about the second crosslinking temperature. That is, the precursor compound may be further crosslinked within the cavity of the mold.

For example, the precursor compound may continue to travel through the injection molding device, e.g., through a second portion of the injection molding device, and advance through the injection molding device via the one or more screws (not shown) towards the cavity of the mold. As the one or more screws continue to advance the precursor compound through the injection molding device, the precursor compound may be injected into the cavity of the mold and heated to the about the second crosslinking temperature. The precursor compound may be further crosslinked within the cavity of the mold to thereby form the cured elastomer.

B. Compression Molding

With continued reference to FIG. 3, in another embodiment, the method 110 may include, concurrent to partially crosslinking 20, compression molding 32 the elastomer compound within the cavity defined by the mold. That is, the elastomer compound may be partially crosslinked within the cavity of the mold. For example, the mold may include a first portion and a second portion matable with the first portion to define the cavity therebetween. The elastomer compound may be heated to about the first crosslinking temperature and disposed within the first portion of the open, heated cavity of the mold, and the second portion may mate with the first portion to seal off the cavity. As such, the elastomer compound may be partially crosslinked within the cavity of the mold to thereby form the precursor compound.

That is, as shown in FIG. 3, the resulting precursor compound formed during compression molding 32 may then be subsequently processed to form the cured elastomer. For example, further crosslinking 122 may include compression molding 32 the precursor compound within the cavity defined by the mold and heating 30 the precursor compound to about the second crosslinking temperature. For example, the precursor compound may be heated to about the second crosslinking temperature and disposed within the first portion of the open, heated cavity of the mold, and the second portion may mate with the first portion to seal off the cavity. As such, the precursor compound may be further crosslinked within the cavity of the mold to thereby form the cured elastomer. For this embodiment, the cured elastomer may be formed into the cured elastomer article.

C. Extruding

Alternatively, in another embodiment described with continued reference to FIG. 3, the method 110 may further include, concurrent to partially crosslinking 20, extruding 34 the elastomer compound through a plurality of openings defined by a die to thereby form a plurality of pellets formed from the precursor compound. For example, the elastomer compound may be extruded through the plurality of openings and cut to form the plurality of pellets. In particular, the elastomer compound may be injected into an extruder (not shown), and advanced through the extruder by one or more screws (not shown) towards the plurality of openings of the die. As the one or more screws advance the elastomer compound through the extruder, the elastomer compound may be heated to the about the first crosslinking temperature. As such, the elastomer compound may be partially crosslinked within the extruder and extruded through the plurality of openings to thereby form the precursor compound in pelletized form. For this embodiment, the precursor compound may be formed into the plurality of pellets that may be subsequently fed to an injection molding device or a compression molding device.

Advantageously, the resulting plurality of pellets formed from the precursor compound may have sufficient mechanical integrity such that the plurality of pellets may not fuse together, but may instead remain separated as individual pellets. As such, the plurality of pellets may be optionally mixed with other feedstock or subsequently processed, e.g., molded by injection or compression, into one or more intermediate layers 18, 19 (FIG. 4) or the center 16 (FIG. 4) of the golf ball 112 (FIG. 4).

Referring again to FIG. 3, the resulting plurality of pellets formed from the precursor compound during extrusion may then be subsequently processed to form the cured elastomer. For example, further crosslinking 22 may include injecting 28 the plurality of pellets into the cavity defined by the mold and heating 30 the plurality of pellets to about the second crosslinking temperature. That is, the precursor compound in pelletized form may be further crosslinked via an injection molding device (not shown). For example, the precursor compound may advance through the injection molding device by one or more screws towards the cavity of the mold. As the one or more screws advances the precursor compound through the injection molding device, the precursor compound may be injected into the cavity of the mold and heated to about the second crosslinking temperature. As such, the precursor compound may be further crosslinked within the cavity of the mold to thereby form the cured elastomer. For this embodiment, the cured elastomer may have any desired shape, such as one or more half shells (not shown) that may subsequently mate to form the golf ball 112 (FIG. 4). Two half shells formed from the cured elastomer may be subsequently fused, for example, with heat or an adhesive, into one or more intermediate layers 18, 19 (FIG. 4) or the center 16 of the golf ball 112.

Alternatively, as shown in FIG. 3, the resulting plurality of pellets formed during extruding 34 may then be subsequently compression molded to form the cured elastomer. For example, further crosslinking 22 may include compression molding 32 the plurality of pellets within the cavity defined by the mold and heating 30 the precursor compound to about the second crosslinking temperature. That is, the precursor compound may be further crosslinked by compression molding 32 the precursor compound in pelletized form within the cavity of the mold. For example, the precursor compound may be heated to about the second crosslinking temperature and disposed within the first portion of the open, heated cavity of the mold, and the second portion may mate with the first portion to seal off the cavity. As such, the precursor compound may be further crosslinked within the cavity of the mold to thereby form the cured elastomer. For this embodiment, the cured elastomer may be formed into a desired shape, such as the center 16 (FIG. 4) of the golf ball 112 (FIG. 4).

Golf Ball Manufacturing

Referring now to FIGS. 3 and 4, the method 110 (FIG. 3) also includes disposing 36 (FIG. 3) the cover 24 (FIG. 4) on the outermost intermediate layer 19 (FIG. 4), such that the cover 24 surrounds the outermost intermediate layer 19 to thereby form the golf ball 112 (FIG. 4). For example, the cover 24 may also be formed by compression molding or injection molding, and may include a first hemispherical half and a second hemispherical half which may cooperate to surround the core 14. The cover 24 may have a plurality of dimples 26 and may be configured or arranged to affect a spin rate of the golf ball 112 during flight. As such, the cover 24 may be a comparatively thin, exterior structural layer of the golf ball 112. The cover 24 may also include a non-structural layer, such as a coating, e.g., a brand marking, a color coat, or a clearcoat.

In general, the golf ball 112 may be formed through one or more injection molding or compression molding steps. For example, in one configuration, the fabrication of a multi-layer golf ball 112 may include: forming a center 16 through injection molding; compression molding a cold-formed or partially-crosslinked elastomer intermediate layer 18 about the center 16; compression or injection molding a further intermediate layer 19 around intermediate layer 18; and forming a cover layer 24 about the intermediate layer 19 though injection molding or compression molding.

In certain embodiments, the center 16 may be made, for example by compression or injection molding, from an elastomer compound by two-crosslinking temperature method. In certain embodiments, one or more intermediate layers may be formed between the center 16 and the elastomer intermediate layer 18 and the ball then may or may not include an intermediate layer 19 or other intermediate layers around the intermediate layer 18. In other embodiments, cover layer 24 may be formed from the elastomer compound or partially-crosslinked elastomer instead of or in addition to a center or intermediate layer that is formed from the elastomer compound or partially-crosslinked elastomer.

As schematically illustrated in FIGS. 5A & 5B, during the injection molding process used to form the center 16, two hemispherical dies 150, 152 may cooperate to form a mold cavity 154 that may be filled with a thermoplastic material 156 in a flowable state. The hemispherical molding dies 150, 152 may meet at a parting line 158. In one configuration, a thermoplastic ionomer may be used to form the center 16. Suitable thermoplastic ionomeric materials are commercially available, for example, from the E. I. du Pont de Nemours and Company. In particular embodiments, the center may be formed from a highly neutralized thermoplastic ionomer composition in which the ionomer resin is formed by adding a sufficiently high molecular weight, monomeric, mono-functional organic acid or salt of organic acid to the acid copolymer or ionomer so that the acid copolymer or ionomer can be neutralized, without losing processability, to a level above the level that would cause the ionomer alone to become non-melt-processable.

Once the material 156 is cooled to ambient temperature, it may harden and be removed from the molding dies. Once the center 16 is formed and removed from the mold, any molding flash may be removed using any combination of cutting, grinding, sanding, tumbling with an abrasive media, and/or cryogenic deflashing. Following the deflashing, an adhesive or bonding agent may be applied to the outer surface of the center, such as through spraying, tumbling, and/or dipping. Additionally, one or more surface treatments may also be employed at this stage, such as mechanical surface roughening, plasma treatment, corona discharge treatment, or chemical treatment to increase subsequent adhesion to intermediate layer 18. Nonlimiting, suitable examples of adhesives and bonding agents that may be used include polymeric adhesives such as ethylene vinyl acetate copolymers, two-component adhesives such as epoxy resins, polyurethane resins, acrylic resins, polyester resins, and cellulose resins and crosslinkers therefor, e.g., with polyamine or polycarboxylic acid crosslinkers for polyepoxides resins, polyisocyanate crosslinkers for polyalcohol-functional resins, and so on; or siliane coupling agents or silane adhesives. The adhesive or bonding agent may be used with or without a surface treatment such as mechanical surface roughening, plasma treatment, corona discharge treatment, or chemical treatment.

Once any surface coatings/preparations are applied/performed (if any), the intermediate layer 18 may then be formed around the center 16, for example, through a compression molding process. During compression molding, two hemispherical blanks of the elastomer compound or the precursor compound may be press-fit around the center 16. Once positioned, a suitable die may apply heat and/or pressure to the exterior of the blanks to cure/crosslink the blanks while fusing them together in, for blanks of the elastomer compound, a two-stage cure at the first and second crosslinking temperatures or, for blanks of the precursor compound, the final crosslinking at the second crosslinking temperature. During the curing process, the application of heat and the applied pressure may cause the elastomer material to conform to and adhere to the outer surface of the center 16.

FIGS. 6A-6D further illustrate an embodiment of a process that may be used to compression mold an intermediate layer 18 about the center 16. As shown in FIG. 6A, the intermediate layer may begin as piece of elastomer compound 160 that includes the elastomer, the first free radical initiator, the second free radical initiator, the third free radical initiator, an unsaturated monomer, e.g., unsaturated carboxylic acid or the metal salt of the unsaturated carboxylic acid which may act as a crosslinking agent or other crosslinking agents, and optionally fillers or other additives that may be homogeneously or heterogeneously mixed throughout the piece 160. The piece 160 may, for example, be compounded in an extruder and extruded in a sheet or other appropriate form for further processing. In one embodiment, the compounded elastomer is partially crosslinked at the third crosslinking temperature in the extruder. In another embodiment, the elastomer is partially crosslinked at the first and second crosslinking temperatures sequentially in the extruder so that piece 160 comprises the precursor compound. The elastomer remains thermoplastic in the precursor compound.

The piece 160 may be formed into a substantially hemispherical blank 162 (shown in FIG. 6B) through one or more cutting, stamping, or pressing processes. As schematically shown in FIG. 6C, two compression molding dies 164, 166 may form a pair of opposing blanks 168, 170 about a spherical metal core 172. In another embodiment, a hemispherical shell is molded, for example by compression molding or injection molding, using a set of male and female molds. In an embodiment in which no crosslinking of the elastomer polymer was carried out in the extruder, the forming of pieces 160 into a pair of opposing blanks 168, 170 between the compression molding dies may include partial crosslinking at the third crosslinking temperature to provide opposing blanks 168, 170 of partially crosslinked elastomer or may include partial crosslinking at both the third crosslinking temperature and the first crosslinking temperature to provide opposing blanks 168, 170 of the precursor compound. In a further example, when the compounded elastomer is partially crosslinked at the third crosslinking temperature in the extruder, the elastomer may be further crosslinked at the first crosslinking temperature in this step to provide opposing blanks 168, 170 of the precursor compound.

Finally, as shown in FIG. 6D, the spherical metal core 172 may be replaced by the center 16, and the blanks 168, 170 may be compression molded a second time by a second pair of opposing molding dies 172, 174 (which may or may not be the same dies 164, 166 used in the prior step). During this stage, the dies 172, 174 apply a sufficient amount of heat and pressure to cause the blanks 168, 170 to flow within the mold cavity, fuse to each other, and crosslink to form the cured elastomer article. When the elastomer has experienced no crosslinking, the cure may be a two-stage cure, with partial crosslinking optionally at the third crosslinking temperature, then partial crosslinking at the first crosslinking temperature to form the precursor compounds followed by further crosslinking of the precursor compound at the second crosslinking temperature to form the cured elastomer article. When the elastomer been partially crosslinked at the third crosslinking temperature, whether in the extruder or during forming of the opposing blanks 168, 170, the cure in the compression mold may be a two-stage cure, with partial crosslinking at the first crosslinking temperature to form the precursor compounds followed by further crosslinking of the precursor compound at the second crosslinking temperature to form the cured elastomer article. When the opposing blanks 168, 170 have already been crosslinked to form the precursor compound, the opposing blanks 168, 170 are further cured at the second crosslinking temperature in the compression mold to form the cured elastomer article.

Once set, the intermediate ball (i.e., the joined center 16 and intermediate layer 18) may be removed from the mold.

The cover layer 24 may generally surround the core (in FIG. 4, enclosing outer intermediate layer 19), and the cover layer 24 defines the outermost surface of the ball 112. The cover may generally be formed from a thermoplastic material, such as a thermoplastic polyurethane that may have a flexural modulus of up to about 1000 psi. In other embodiments, the cover may be formed from an ionomer, such as commercially available from the E. I. du Pont de Nemours and Company under the tradename Surlyn®.

The resulting golf ball formed from the elastomer compound includes a core and a cover disposed on and surrounding the core. In various embodiments, the golf ball may be a two-piece ball having the core and the cover or may be a multi-piece ball in which the core is made of a center and an intermediate layer disposed between the center and the cover. FIG. 4 illustrates a four-piece ball with a core made up of a center 16 and two intermediate layers 18 and 19 between the center 16 and a cover 24. The center or one or both of the intermediate layers 18,19 may be formed from the cured elastomer, which may increase a coefficient of restitution (COR) of the golf ball 112.

A coefficient of restitution (COR) for a golf ball may be measured by firing the golf ball from an air cannon at an initial velocity of 40 msec towards a steel plate positioned at about 1.2 meters apart from the air cannon. In addition, a speed monitoring device may be spaced apart from the air cannon over a distance of about 0.7 meters. After the golf ball strikes the steel plate, the golf ball rebounds through the speed-monitoring device at a return velocity. The coefficient of restitution for the golf ball is calculated by dividing the return velocity of the golf ball by the initial velocity of the golf ball.

The core comprises the cured elastomer, and the cured elastomer is formed from an elastomer compound comprising the ethylenically unsaturated elastomer, the first free radical initiator having the first one-minute half-life temperature, and the second free radical initiator having the second one-minute half-life temperature that is higher than the first one-minute half-life temperature by at least about 30° C. The elastomer compound is partially crosslinked at the first crosslinking temperature that is equal to from about 20° C. lower than the first one-minute half-life temperature to about 20° C. higher than the first one-minute half-life temperature to form the precursor compound. The precursor compound is further crosslinked at the second crosslinking temperature that is higher than the first crosslinking temperature. The second crosslinking temperature is equal to from about 20° C. lower than the second one-minute half-life temperature to about 20° C. higher than the second one-minute half-life temperature to thereby form the cured elastomer.

The golf ball 112 (FIG. 4) formed from the elastomer compound may have an excellent coefficient of restitution. As used herein, the terminology "coefficient of restitution" is a measurement of a resilience of the golf ball 112. The coefficient of restitution may be calculated by dividing a return velocity of the golf ball 112 by an initial velocity of the golf ball 112 after the golf ball 112 strikes and rebounds from a steel plate.

The method 110 (FIG. 1) of forming the elastomer compound and the method 110 (FIG. 3) of forming the golf ball 112 (FIG. 4) may contribute to the excellent coefficient of restitution of the golf ball 112. In particular, partially crosslinking 20 (FIG. 1) the elastomer compound with the first free radical initiator at the first crosslinking temperature and further crosslinking 22 (FIG. 1) the precursor compound with the second free radical initiator at the second crosslinking temperature may provide the elastomer compound with excellent resilience and softness as compared to other elastomer compounds which are not formed via the aforementioned dual-stage cure and dual-cure temperature methods 10,110.

The cured elastomer, and articles 12 (FIG. 2) formed from the cured elastomer, may have excellent physical properties. For example, the cured elastomer and articles 12 may have excellent resilience. In particular, partially crosslinking the elastomer compound with the first free radical initiator at the first crosslinking temperature and further crosslinking the precursor compound with the second free radical initiator at the second crosslinking temperature may provide the cured elastomer with excellent resilience and softness as compared to other cured elastomers which are not formed via the dual-stage cure and dual-cure temperature methods 10, 110. For example, the golf ball 112 (FIG. 4) formed by the method 110 (FIG. 3) may have excellent elasticity, and may exhibit excellent durability over an operating life and acceptable spin during flight.

The following examples are meant to illustrate the disclosure and are not to be viewed in any way as limiting to the scope of the disclosure.

EXAMPLES 1-8

To prepare each of the cured elastomers of Examples 1-8, components A-G are combined in the amounts listed in Table 1 to form respective elastomer compounds.

The unit of measurement for the values listed in Table 1 for component A is parts by weight. Further, the unit of measurement for the values listed in Table 1 for components B-G is parts by weight based on 100 parts by weight of component A.

TABLE 1

Elastomer compound Components

| Example | A | B | C | D | E | F | G |
|---------|-----|----|---|-------|-------|------|------|
| Ex. 1 | 100 | 20 | 4 | 0.025 | — | 0.25 | — |
| Ex. 2 | 100 | 20 | 4 | 0.050 | — | 0.25 | — |
| Ex. 3 | 100 | 20 | 4 | — | 0.020 | 0.25 | — |
| Ex. 4 | 100 | 20 | 4 | — | 0.035 | 0.25 | — |
| Ex. 5 | 100 | 20 | 4 | 0.025 | — | — | 0.25 |
| Ex. 6 | 100 | 20 | 4 | 0.050 | — | — | 0.25 |
| Ex. 7 | 100 | 20 | 4 | — | 0.020 | — | 0.25 |
| Ex. 8 | 100 | 20 | 4 | — | 0.035 | — | 0.25 |

TABLE 2

Elastomer compound Components

| Example | A | B | C | D | E | F | G |
|---------|-----|----|---|-------|-------|------|------|
| Ex. 9 | 100 | 20 | 4 | 0.025 | — | 0.25 | — |
| Ex. 10 | 100 | 20 | 4 | 0.050 | — | 0.25 | — |
| Ex. 11 | 100 | 20 | 4 | — | 0.020 | 0.25 | — |
| Ex. 12 | 100 | 20 | 4 | — | 0.035 | 0.25 | — |
| Ex. 13 | 100 | 20 | 4 | 0.025 | — | — | 0.25 |
| Ex. 14 | 100 | 20 | 4 | 0.050 | — | — | 0.25 |
| Ex. 15 | 100 | 20 | 4 | — | 0.020 | — | 0.25 |
| Ex. 16 | 100 | 20 | 4 | — | 0.035 | — | 0.25 |

Component A is a high 1,4-cis polybutadiene rubber commercially available from Kumho Asiana Group of Seoul, South Korea.

Component B is zinc diacrylate, which is commercially available from Nippon Shokubai of Tokyo, Japan Component C is zinc oxide, which is commercially available from Akzo Nobel Polymer Chemicals LLC of Chicago, Ill.

Component D is dibenzoyl peroxide, which has a one-minute half-life temperature of about 131° C. and is commercially available from Sigma Aldrich of St. Louis, Mo.

Component E is (1,1'bis-t-butylperoxy)-3,3,5-trimethyl-cyclohexane, which has a first one-minute half-life temperature of about 152° C. and is commercially available from Akzo Nobel Polymer Chemicals LLC of Chicago, Ill.

Component F is di-t-butyl peroxide, which has a one-minute half-life temperature of about 193° C. and is commercially available from Akzo Nobel Polymer Chemicals LLC of Chicago, Ill.

Component G is cumyl hydroperoxide, which has a one-minute half-life temperature of about 260° C. and is commercially available from Sigma Aldrich of St. Louis, Mo.

Each of the elastomer compounds of Examples 1-8 is prepared by mixing the components listed in Table 1 in an extruder. After thorough mixing in a first zone of the extruder, each elastomer compound is partially crosslinked in a downstream zone of the extruder at a first crosslinking temperature of about 150° C. for about five minutes to form the respective precursor compounds of Examples 1-8. The precursor compounds are extruded and pelletized. Subsequently, each of the extruded precursor compounds of Examples 1-8 is further crosslinked during compression molding of the precursor compounds. In particular, each precursor compound is further crosslinked at a second crosslinking temperature of about 230° C. for about 15 minutes to form articles of the respective cured elastomers of Examples 1-8.

EXAMPLES 9-16

The same components A-G are combined in the amounts shown in Table 2 using a two-roll mill to form elastomer compounds Examples 9-16 are combined in the amounts listed in Table 1 to form respective elastomer compounds. The unit of measurement for the values listed in Table 2 for component A is parts by weight, and the unit of measurement for the values listed in Table 2 for components B-G is parts by weight based on 100 parts by weight of component A.

Each of the elastomer compounds is introduced into a compression mold. For each elastomer compound of Examples 9-16, the compression mold is heated to 150° C., and the elastomer compound is crosslinked at that temperature for five minutes to form a precursor compound. Then, the mold is further heated to 230° C. and the precursor compound is subjected to a second crosslinking at that temperature for fifteen minutes to form a cured elastomer.

While the best modes for carrying out the disclosure have been described in detail, those familiar with the art to which this disclosure relates will recognize various alternative designs and embodiments for practicing the disclosure within the scope of the appended claims. It is intended that all matter contained in the above description or shown in the accompanying drawings shall be interpreted as illustrative only and not as limiting.

What is claimed is:

1. A method of making a cured elastomer comprising:
heating an elastomer compound comprising an ethylenically unsaturated elastomer, an ethylenically unsaturated monomer, a first free radical initiator, and a second free radical initiator to a first crosslinking temperature in a compression mold and partially crosslinking the elastomer to form a precursor compound;
further heating the precursor compound in the compression mold from the first crosslinking temperature to a second crosslinking temperature and further crosslinking the elastomer to form a cured elastomer,
wherein the precursor compound has a crosslink density of from about 2% to about 40% of the crosslink density of the cured elastomer and
wherein the first free radical initiator has a half-life of from about 0.2 minutes to about 5minutes at the first crosslinking temperature, the second free radical initiator has a half-life of from about 0.2 minutes to about 5 minutes at the second crosslinking temperature, and the second crosslinking temperature is higher than the first crosslinking temperature by at least about 30° C.

2. A method according to claim 1, wherein the ethylenically unsaturated elastomer comprises polybutadiene and the ethylenically unsaturated monomer comprises a member selected from the group consisting of unsaturated carboxylic acids, metal salts of unsaturated carboxylic acids, and combinations thereof.

3. A method according to claim 1, wherein the cured elastomer is formed as a layer.

4. A method according to claim 1, further comprising partially crosslinking the elastomer compound at a third crosslinking temperature before heating the elastomer compound to the first crosslinking temperature, wherein the elastomer compound further comprises a third free radical initiator wherein
the third free radical initiator has a half-life of from about 0.2 minutes to about 5 minutes at the third crosslinking temperature and the first crosslinking temperature is higher than the third crosslinking temperature by at least about 20° C.

5. A method according to claim 4, wherein the step of partially crosslinking the elastomer compound at a third crosslinking temperature takes place before the elastomer compound is placed in the compression mold.

6. A method according to claim 1, wherein the second crosslinking temperature is higher than the first crosslinking temperature by at least about 50° C.

7. A method of forming a cured elastomer compound, the method comprising:
  (a) partially crosslinking an elastomer compound in an extruder at a first crosslinking temperature to form a precursor compound, wherein the elastomer compound comprises an ethylenically unsaturated elastomer, a first free radical initiator, and a second free radical initiator; and
  (b) molding and further crosslinking the precursor compound in a mold at a second crosslinking temperature to form a cured elastomer compound;
  wherein the precursor compound has a crosslink density of from about 2% to about 5% of the crosslink density of the cured elastomer compound
  and
  wherein either:
  (i) the first free radical initiator has a half-life of from about 0.2 minutes to about 5 minutes at the first crosslinking temperature, the second free radical initiator has a half-life of from about 0.2 minutes to about 5 minutes at the second crosslinking temperature, and the second crosslinking temperature is higher than the first crosslinking temperature by at least about 30° C.; or
  (ii) the first free radical initiator has a first one-minute half-life temperature, the second free radical initiator has a second one-minute half-life temperature that is higher than the first one-minute half-life temperature by at least about 30° C., the first crosslinking temperature is from about 20° C. lower than the first one-minute half-life temperature to about 20° C. higher than the first one-minute half-life temperature, and the second crosslinking temperature from about 20° C. lower than the second one-minute half-life temperature to about 20° C. higher than the second one-minute half-life temperature.

8. A method according to claim 7, the precursor compound is extruded from the extruder into the mold.

9. A method according to claim 7, further comprising extruding and pelletizing the precursor compound to form pellets of the precursor compound wherein the pellets of the precursor compound are placed in the mold.

10. A method according to claim 7, further comprising extruding and pelletizing the precursor compound to form pellets of the precursor compound wherein the pellets of the precursor compound are melted and injected into the mold.

11. A method according to claim 7, wherein the first crosslinking temperature is from about 100° C. to about 190° C. and the elastomer compound is crosslinked at a first crosslinking temperature for from about 0.5 minute to about 5 minutes.

12. A method according to claim 7, wherein the second crosslinking temperature is from about 165° C. to about 280° C. and the precursor compound is crosslinked at a second crosslinking temperature for from about 10 minute to about 30 minutes.

13. A method according to claim 7, wherein (A) the second crosslinking temperature is higher than the first crosslinking temperature by at least about 50° C. or (B) the second one-minute half-life temperature is higher than the first one-minute half-life temperature by at least about 50° C. or both (A) and (B).

* * * * *